(12) United States Patent
Bandholz et al.

(10) Patent No.: US 9,213,380 B2
(45) Date of Patent: Dec. 15, 2015

(54) MAPPING COMPUTERS AND PORTS OF POWER DISTRIBUTION UNITS IN A DATA CENTER

(75) Inventors: Justin P. Bandholz, Cary, NC (US); William J. Piazza, Holly Springs, NC (US); Philip L. Weinstein, Apex, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1098 days.

(21) Appl. No.: 12/135,305

(22) Filed: Jun. 9, 2008

(65) Prior Publication Data

US 2009/0307515 A1    Dec. 10, 2009

(51) Int. Cl.
*G06F 1/26* (2006.01)
*G06F 1/00* (2006.01)
*H04L 9/32* (2006.01)

(52) U.S. Cl.
CPC ... *G06F 1/26* (2013.01); *G06F 1/00* (2013.01); *H04L 9/32* (2013.01)

(58) Field of Classification Search
CPC ................ G06F 1/26; G06F 1/00; H04L 9/32
USPC .......................................... 713/168, 300, 340
See application file for complete search history.

(56) References Cited

U.S. PATENT DOCUMENTS

| | | | |
|---|---|---|---|
| 5,594,631 A * | 1/1997 | Katoozi et al. | 363/41 |
| 5,752,046 A * | 5/1998 | Oprescu et al. | 713/300 |
| 6,127,741 A | 10/2000 | Matsuda et al. | |
| 6,757,835 B2 * | 6/2004 | Kano et al. | 713/340 |
| 6,904,534 B2 | 6/2005 | Koenen | |
| 7,030,734 B2 * | 4/2006 | Butler et al. | 340/3.43 |
| 7,135,956 B2 * | 11/2006 | Bartone et al. | 340/3.9 |
| 7,145,439 B2 | 12/2006 | Darshan et al. | |
| 7,269,753 B2 * | 9/2007 | Farkas et al. | 713/340 |
| 7,529,949 B1 * | 5/2009 | Ranganathan et al. | 713/300 |
| 7,917,792 B2 * | 3/2011 | Brech et al. | 713/340 |
| 8,726,045 B2 * | 5/2014 | Goodrum et al. | 713/300 |
| 2004/0177283 A1 * | 9/2004 | Madany et al. | 713/300 |
| 2005/0086544 A1 * | 4/2005 | Egan et al. | 713/300 |
| 2006/0195275 A1 | 8/2006 | Latham et al. | |
| 2007/0240017 A1 | 10/2007 | Takahashi | |
| 2009/0189774 A1 * | 7/2009 | Brundridge et al. | 340/654 |

(Continued)

FOREIGN PATENT DOCUMENTS

EP    1 536 314 A2    6/2005

*Primary Examiner* — Ryan Stiglic
*Assistant Examiner* — Christopher A Daley
(74) *Attorney, Agent, or Firm* — Edward J. Lenart; Katherine S. Brown; Kennedy Lenart Spraggins LLP

(57) ABSTRACT

Mapping computers and ports of power distribution units in a data center, the data center including a plurality of computers and a data center management server, each computer in the data center connected for power to one of a plurality of power distribution unit ('PDU') ports of a PDU, each PDU connected through the communications module and a data communications network to the data center management server, including generating, by a power modulating module of a computer, a power consumption signal in the PDU, the power consumption signal encoding a unique identification of the computer; demodulating, by the PDU, the power consumption signal, including retrieving from the signal the unique identification of the computer; and reporting, by the PDU to the data center management server, an association of the unique identification of the computer and a PDU port.

21 Claims, 2 Drawing Sheets

(56) References Cited

U.S. PATENT DOCUMENTS

| | | | |
|---|---|---|---|
| 2009/0235097 A1* | 9/2009 | Hamilton et al. | 713/320 |
| 2009/0282274 A1* | 11/2009 | Langgood et al. | 713/320 |
| 2009/0287949 A1* | 11/2009 | Bradicich et al. | 713/340 |
| 2011/0022245 A1* | 1/2011 | Goodrum et al. | 700/297 |

* cited by examiner

MAPPING COMPUTERS AND PORTS OF POWER DISTRIBUTION UNITS IN A DATA CENTER

BACKGROUND OF THE INVENTION

1. Field of the Invention

The field of the invention is data processing, or, more specifically, methods, apparatus, and products for mapping computers and ports of power distribution units in a data center.

2. Description of Related Art

The development of the EDVAC computer of 1948 is often cited as the beginning of the computer era. Since that time, computers have evolved into extremely complicated devices. Today's computers are much more sophisticated than early systems such as the EDVAC. Computers typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computers today that are much more powerful than just a few years ago.

Computer systems today are often organized in data centers. Such data centers may contain hundreds or thousands of computers. Such computers are typically connected to a power distribution unit that distributes power to the computers. Current methods of identifying connections between specific computers and ports of a power distribution unit ('PDU') are time-consuming and typically require manual inspection and mapping of the connection. That is, such mapping typically requires a great deal of human action by, for example, a data center administrator or a computer installation technician.

SUMMARY OF THE INVENTION

Methods, apparatus, and products for mapping computers and ports of power distribution units in a data center, the data center including a facility that houses a plurality of computers and equipment supporting computer operations including a data center management server, the computers in the data center connected for power to one of a plurality of power distribution unit ('PDU') ports of a PDU, the PDU comprising one or more power consumption monitoring devices, one or more demodulators, and a communications module, each PDU connected through the communications module and a data communications network to the data center management server. Embodiments of the present invention include generating, by a power modulating module of a computer, a power consumption signal in the PDU, the power consumption signal encoding a unique identification of the computer; demodulating, by the PDU, the power consumption signal, including retrieving from the signal the unique identification of the computer; and reporting, by the PDU to the data center management server, an association of the unique identification of the computer and a PDU port.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
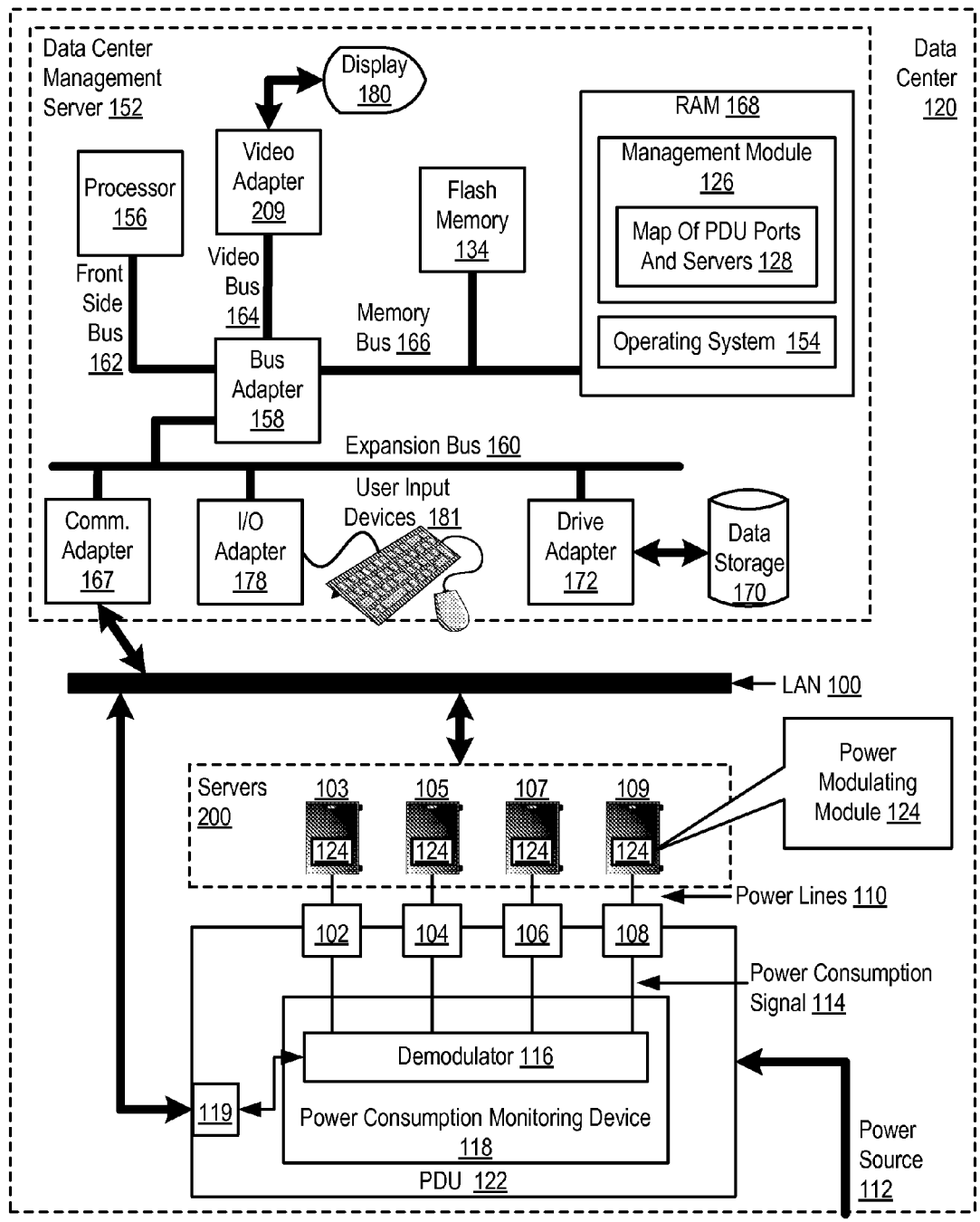
FIG. 1 sets forth a functional block diagram of an exemplary system for mapping computers and ports of PDUs in a data center according to embodiments of the present invention.

Exemplary methods, apparatus, and products for mapping computers and ports of PDUs in a data center in accordance with the present invention are described with reference to the accompanying drawings, beginning with FIG. 1. FIG. 1 sets forth a functional block diagram of an exemplary system for mapping computers and ports of PDUs in a data center (120) according to embodiments of the present invention. The data center (120) is a facility used to house mission critical computers and associated components. Such a data center includes environmental controls (air conditioning, fire suppression, etc.), redundant/backup power supplies, redundant data communications connections, and high security, highlighted by biometric access controls to compartmentalized security zones within the facility. A data center is also used for housing a large amount of electronic equipment, typically computers and communications equipment. A data center may be maintained by an organization for the purpose of handling the data necessary for its operations. A bank, for example, may have a data center, where all its customers' account information is maintained and transactions involving these accounts are carried out. Practically every company that is mid-sized or larger has some kind of data center with the larger companies often having dozens of data centers.

The data center (120) in the example of FIG. 1 includes one or more power consuming computers (200), that is, automated computing machinery requiring electrical power to operate. Examples of computers include personal computers, workstations, laptops, servers and so on as will occur to those of skill in the art. The system of FIG. 1 includes a group of example computer, depicted as blade servers (200). With respect to the example of FIG. 1, the terms 'blade server' and 'computer' are used interchangeably. The blade servers (200) are connected for data communications to a data center management server (152) through a local area network ('LAN') (100). The LAN (100) is an aggregation of data communications switches, routers, cables, software, and so on, capable of connecting computing devices for data communications.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, FTP servers, application servers, VPN servers, DHCP servers, DNS servers, WINS servers, logon servers, security servers, domain controllers, backup domain controllers, proxy servers, firewalls, and so on.

Blade servers are self-contained servers, designed for high density. A blade enclosure provides services such as power, cooling, networking, various interconnects and management—though different blade providers have differing principles around what should and should not be included in the blade itself—and sometimes in the enclosure altogether. Together, a set of blade servers installed in a blade enclosure or 'blade center' for a blade system. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade enclosure (DC power) virtualized (iSCSI storage, remote console over IP), or discarded entirely (serial ports). The blade itself becomes simpler, smaller, and amenable to dense installation with many blade servers in a single blade enclosure.

Each of the blade servers (200) in the example of FIG. 1 is connected for power to a PDU port (102, 104, 106, 108) of a PDU (122). A power distribution unit ('PDU') is a device that distributes electric power to computer systems in a data center through a port, referred to in this specification as a PDU port. Large industrial PDUs are used for reducing high voltage and amperage to more common and useful levels, for example from 220V 30 A single phase to multiple 110V 15 A or 110V 20 A ports. In the example of FIG. 1, the PDU (122) distributes power from a power source (112) to the servers (100) through PDU ports (102, 104, 106, 108) and power lines (110). A PDU port is a physical connection point that adapts a power line (110) of a computer to the PDU.

In the example of FIG. 1, the PDU (122) includes a power consumption monitoring device (118), a demodulator (116), and a communications module (119). A power consumption monitoring device (118) is an aggregation of computer hardware and software capable of continuously monitoring power consumption through each PDU port.

A demodulator (116) is a device used to recover information from a signal. In the example of FIG. 1, the demodulator (116) is configured to demodulate the power consumption signal (114). The demodulator may be implemented to demodulate frequency modulated signals, amplitude modulated signals, pulse-code modulated signals, and so on as will occur to those of skill in the art. The demodulator may be implemented as a set of computer program instructions, a Field Programmable Gate Array ('FPGA'), an Application Specific Integrated Circuit ('ASIC'), or in other ways as will occur to those of skill in the art.

In the example of FIG. 1, the PDU is connected through the communications module (119) and a data communications network (100) to the data center management server (152). A communications module (119) of a PDU may be an aggregation of computer hardware and software capable of converting data into data communications packet format for transmission to a data center management server over a data communications network. Converting data into packet format may include, for example, converting the data into TCP/IP packet format, Ethernet packet format, or the like, by creating a packet header identifying a destination address, such as an IP address, of the data center management server, inserting the data as the payload of the data communications packet, and transmitting the data communications packet through the data communications network (100). Readers of skill in the art will recognize that data communications packets including data from a PDU may include other parts, headers, footers, including more or less information as may occur to those of skill in the art.

The system of FIG. 1 operates generally for mapping computers and ports of PDUs in a data center in accordance with the present invention by generating, by a power modulating module (124) of a computer (200), a power consumption signal (114) in the PDU (122). In the example of FIG. 1, the power consumption signal (114) encodes a unique identification of the computer. A unique identification of the computer may be any identification capable of distinguishing one computer from another computer in the data center (120). Such a unique identification may include a serial number, a media access control ('MAC') address, an IP address, a network interface controller serial number, a user-designated identification, and others as will occur to those of skill in the art.

In addition to the unique identification of a computer, the power consumption signal (114) may also encode error detection or error correction data such as checksums, cyclical redundancy check data, parity bits, and the like. Such error detection or error detection data encoded in the stream may be used to differentiate between modulation carried out by the power modulating module (124) and variations in the power consumption signal caused by typical noise in the power lines.

The power modulating module (124), in the example of FIG. 1, may generate a power consumption signal (114) in the PDU (122) by modulating or varying the power consumption of a computer system. A power consumption signal, as the term is used in this specification, is a signal generated by varying, that is, 'modulating,' the power consumption of a computer. The power modulating module (124) may vary the power consumption of a computer a relatively small amount so as not to imbalance typical power delivery to the module, thereby generating an amplitude modulation of the raw power delivery. Alternatively, the power modulating module (124) may vary the power consumption at repeatedly at a periodic rate as to generate a carrier signal on the raw power delivery and then modulate the carrier signal with amplitude modulation, pulse code modulation, frequency modulation, and so on, as will occur to those of skill in the art. The power modulating module (124) effects such variations or modulations in the power consumption of the computer by varying CPU speed, alternating execution by the CPU of computer program instructions consuming various amounts of power, by altering a value of a variable resistor connected to a power line, by alternating the execution, by a hardware component of the computer, of tasks causing various levels of power consumption in the computer, and in other ways as will occur to those of skill in the art.

A power modulating module (124) may be implemented according to embodiments of the present invention as a set of computer program instructions capable of controlling power consumption by a computer when executed or as a hardware aggregation of synchronous and asynchronous logic capable of controlling power consumption by a computer. Such a set of computer program instructions may control power consumption by alternating execution of instructions that cause varying levels of power consumption by a computer processor executing the instructions. A hardware aggregation of logic may control power consumption by using power provided to the computer system to execute one or more tasks, where the tasks are configured for varying levels power consumption. The power modulating module (124) may begin modulation of power consumption upon an initial powering-on of the computer, upon behest by the data center management controller, periodically at predefined intervals of time, or at other times as will occur to those of skill in the art.

When the power consumption of a computer varies, the power consumption signal of the monitoring device (118) in the PDU (122) varies accordingly. That is, as power consumption of the computer increases, the value of the power consumption signal increases. The power modulating module (124), by modulating the power consumption of the computer system (200), therefore, may control the power consumption signal generated in the PDU. For this reason, the power consumption signal is described as 'generated' rather than 'sent' or 'transmitted.' Immediately upon varying or modulation the power consumption of a computer by a power modulating module (124) so as to encode a unique identification of the computer on a signal, those variations or modulations are present in the power consumption monitoring device (118) in the PDU, with no need for the power modulating module (124) to send or transmit such variations or modulations.

The system of FIG. 1 also operates generally for mapping computers and ports of PDUs in the data center (120) in accordance with embodiments of the present invention by demodulating, by the PDU (122), the power consumption signal (114). In the example of FIG. 1, the demodulator (116) carries out demodulation of power consumption signals and retrieves from the signal (114) the unique identification of the computer.

The system of FIG. 1 also operates generally for mapping computers and ports of PDUs in the data center (120) in accordance with embodiments of the present invention by reporting, by the PDU to the data center management server, an association of the unique identification of the computer and a PDU port. Such an association of a unique identification of a computer and a PDU port may consist of a port identifier ('Port ID') of the PDU port and the unique identification of a computer. A port ID uniquely identifies a port (102, 104, 106, 108) of a PDU (122). Although the data center (120) in the example of FIG. 1 for convenience of explanation includes only one PDU, readers of skill in the art will recognize that data centers in which PDU ports and computers are mapped in accordance with embodiments of the present invention may include any number of PDUs as may occur to those of skill in the art. A port ID, therefore, in uniquely identifying a single port may uniquely identify a particular PDU. In the example of FIG. 1, the PDU may report an association of the unique identification of the computer and port ID of the PDU port by formatting, through the communications controller (119), the association including a port ID and unique identification into a data communications packet and transmitting the packet to the data center management server (152) over the LAN (100). Consider, as an example, that the PDU (122) reports to the data management server (152) associations of the servers (200) in the example of FIG. 1 and their respective PDU ports. Such a report may include an association of the unique identification of server (103) and the port ID of the PDU port (102), an association of the unique identification of server (105) and the port ID of the PDU port (104), an association of the unique identification of server (107) and the port ID of the PDU port (106), and an association of the unique identification of server (109) and the port ID of the PDU port (108). The PDU may make such a report upon retrieval of any one unique ID, upon retrieving the unique identification through all ports of the PDU, upon a change in an association of a unique identification and a PDU port, periodically upon predefined intervals of time, and so on as will occur to those of skill in the art.

The data center management server (152) in the example of FIG. 1 is a server of the data center (120) that automates many of the processes that are required to proactively manage servers in the data center, including capacity planning, asset tracking, preventive maintenance, diagnostic monitoring, trouble-shooting, firmware updates, and so on. The data center management server (152) of FIG. 1 includes at least one computer processor (156) or 'CPU' as well as random access memory (168) ('RAM') which is connected through a high speed memory bus (166) and bus adapter (158) to processor (156) and to other components of the data center management server (152).

Stored in RAM (168) is a management module (126), a set of computer program instructions that operate the data center management server (152) so as to automatically, under program control, carry out processes required to manage computing devices in the data center, including capacity planning, asset tracking, preventive maintenance, diagnostic monitoring, troubleshooting, firmware updates, and so on. The management module (126) also includes computer program instructions capable of receiving, from a PDU, an association of the unique identification of the computer (200) and the Port ID of the PDU port (102, 104, 106, 108), and adding the association to a map (128). The map (128) in the example of FIG. 1 is a data structure, such as a table, that includes associations of PDU ports and servers. Such a map (128) in accordance with embodiments of the present invention may be generated automatically without human intervention at the time of installation of a computer in the data center. That is, a data center technician may install hundreds of different computers into the data center and connect each computer to different PDU port for power without manually tracking each connection at the time of installation.

Although each server (200) in the example of FIG. 1 is described here as being connected to a different particular PDU port for ease of explanation, readers of skill in the art will recognize that in some embodiments of the present invention, the servers (200) in the example of FIG. 1 may alternatively be installed in a chassis that is connected to a particular PDU port, where power is distributed to the servers from within the chassis. In such an embodiment, each server in the chassis may be mapped to the same particular PDU port.

Also stored in RAM (168) is an operating system (154). Operating systems useful for mapping computers and ports of PDUs in a data center according to embodiments of the present invention include UNIX™, Linux™, Microsoft XP™, Microsoft Vista™, AIX™, IBM's i5/OS™, and others as will occur to those of skill in the art. The operating system (154), the management module (126), and the map (128) of PDU ports and servers in the example of FIG. 1 are shown in RAM (168), but many components of such software typically are stored in non-volatile memory also, such as, for example, on a disk drive (170) or in flash memory (134).

The data center management server (152) of FIG. 1 includes disk drive adapter (172) coupled through expansion bus (160) and bus adapter (158) to processor (156) and other components of the data center management server (152). Disk drive adapter (172) connects non-volatile data storage to the data center management server (152) in the form of disk drive (170). Disk drive adapters useful in data center management servers for mapping computers and ports of PDUs in a data center according to embodiments of the present invention include Integrated Drive Electronics ('IDE') adapters, Small Computer Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example data center management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data center management server (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data center management server (152) of FIG. 1 includes a communications adapter (167) for data communications with other computers and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for mapping computers and ports of PDUs in a data center according to embodiments of the present invention include modems for wired dial-up communications, Ethernet (IEEE 802.3) adapters for wired data communications network communications, and 802.11 adapters for wireless data communications network communications.

The arrangement of servers, PDUs (122), local area networks (100), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
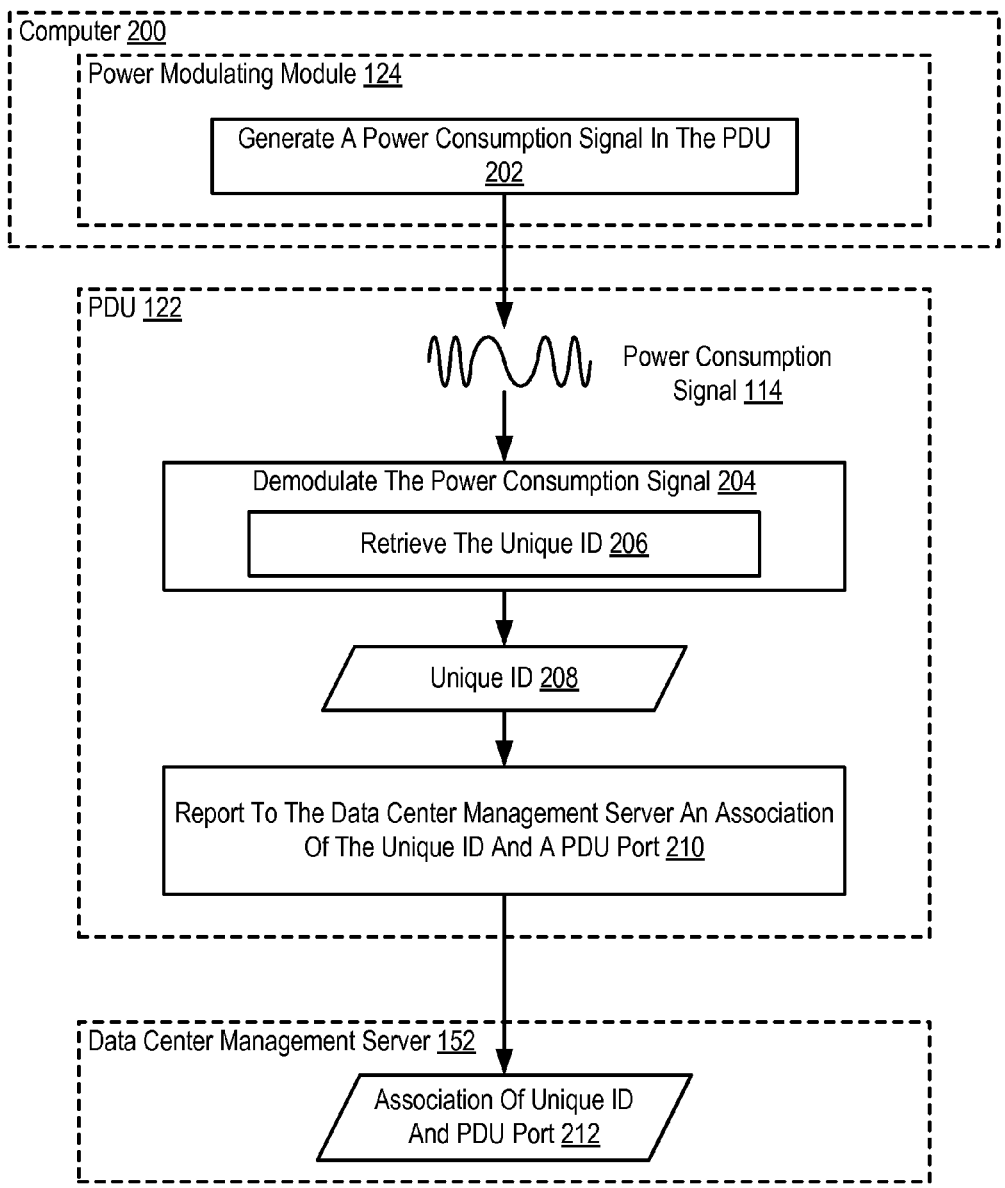
FIG. 2 sets forth a flow chart illustrating an exemplary method for mapping computers and ports of PDUs in a data center according to embodiments of the present invention.

For further explanation, FIG. 2 sets forth a flow chart illustrating an exemplary method for mapping computers and ports of PDUs in a data center (120 on FIG. 1) according to embodiments of the present invention. The method of FIG. 2 may be carried out in a data center (120) similar to that depicted in the example of FIG. 1. In the method of FIG. 2, the data center (120 on FIG. 1) includes a plurality of computers (200) and equipment supporting computer operations including a data center management server (152). Each computer (200) in the method of FIG. 2 is connected for power to a PDU port (102 on FIG. 1) of a PDU (122). The PDU (122) includes one or more power consumption monitoring devices (118 on FIG. 1), one or more demodulators (116 on FIG. 1), and a communications module (119 on FIG. 1). Each PDU (122) is connected through the communications module (119 on FIG. 1) and a data communications network (100 on FIG. 1) to the data center management server (152).

The method of FIG. 2 includes generating (202), by a power modulating module (124) of a computer (200), a power consumption signal (114) in the PDU (122). In the method of FIG. 2, the power consumption signal (114) encodes a unique identification (208) of the computer. In the method of FIG. 2, generating (202) a power consumption signal (114) in the PDU (122) includes modulating the power consumption of the computer to generate an amplitude modulated power consumption signal, modulating the power consumption of the computer to generate a frequency modulated power consumption signal, modulating the power consumption of the computer to generate a phase modulated power consumption signal, or modulating the power consumption of the computer to generate a pulse code modulated power consumption signal.

Amplitude modulation ('AM') is a technique used in electronic communication for transmitting information via a carrier wave. AM includes varying the strength of the transmitted signal in relation to the information being sent, in this case the value of the power consumption signal generated in the PDU. Consider as an example, an amplitude modulated power consumption signal consider a signal that varies over time between a baseline value, such as 25 watts, and a higher value, such as 100 watts. Each sample of the power consumption signal having a value lower than a threshold, such as 50 watts, represents a binary 0, and each sample having a value over the threshold represents a binary 1. The power modulating module of a computer may modulate the power consumption of a computer between 25 and 100 watts at a particular frequency and pattern to encode the computer's unique identification, in binary form, in the power consumption signal (114) generated in the PDU (122).

Frequency modulation ('FM') is a technique used in electronic communication for transmitting information via a carrier wave by varying the frequency of the carrier wave, in this case the frequency of the power consumption signal generated (114) in the PDU (122). Consider as an example, a power consumption signal (114) that varies between a high and low value, such as 25 and 100 watts, at 1 kilohertz to represent a binary 1 and at 100 hertz to represent a binary 0. The power modulating module of a computer may modulate the power consumption of a computer between 25 and 100 watts at 1 kilohertz and 100 hertz to encode the computer's unique identification in the power consumption signal generated in the PDU.

Pulse code modulation is a digital representation of an analog signal where the magnitude of the signal is sampled regularly at uniform intervals, then quantized to a series of symbols in a digital (usually binary) code. Consider as an example, a power consumption signal that varies between a plurality of values where each value, when sampled and quantized represents a binary value. The power modulating module of a computer may modulate the power consumption of a computer to particular values, 10, 20, or 100 watts, for example to encode the computer's unique identification (208) in the power consumption signal generated in the PDU.

Although only three forms of modulation are described here, readers of skill in the art will recognize that many other forms of modulation may be used according to embodiments of the present invention and each such form of modulation is well within the scope of the present invention. Examples of such modulation include phase modulation, quadrature amplitude modulation ('QAM'), Frequency-shift keying ('FSK'), double-sideband modulation, single-sideband modulation, and so on as will occur to those of skill in the art.

The method of FIG. 2 also includes demodulating (204), by the PDU (122), the power consumption signal (114). In the method of FIG. 2, demodulating (204) the power consumption signal (114) includes retrieving (206) from the signal (114) the unique identification (208) of the computer (200). Demodulating (204), by the PDU (122), the power consumption signal (114) may be carried out by processing the power consumption signal by the demodulator (116 in FIG. 1) according to the form of modulation used by the power modulating module of the computer to generate the power consumption signal in the PDU. An FM demodulator may be implemented in the PDU, for example, when the form of modulation used to generate the power consumption signal in the PDU is FM modulation.

The method of FIG. 2 also includes reporting (212), by the PDU (122) to the data center management server (152), an association (212) of the unique identification (208) of the computer and port ID of the PDU port. In the method of FIG. 2, the port ID of the PDU port may include an identification of the PDU port and an identification of the PDU. The PDU may report the association of the unique identification of the computer upon request by the data center management server (152), upon demodulation of the power consumption signal, upon retrieving the unique identification through all ports of the PDU, upon a change in an association of a unique identification and a PDU port, periodically upon predefined intervals of time, and so on as will occur to those of skill in the art.

Exemplary embodiments of the present invention are described largely in the context of a fully functional computer for mapping computers and ports of PDUs in a data center. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of mapping computers and ports of power distribution units in a data center, the data center comprising a facility that houses a plurality of computers and equipment supporting computer operations including a data center management server, the computers in the data center connected for power to one of a plurality of power distribution unit ('PDU') ports of a PDU, the PDU comprising one or more power consumption monitoring devices, one or more demodulators, and a communications module, each PDU connected through the communications module and a data communications network to the data center management server, the method comprising:

generating, by a power modulating module of a computer, a power consumption signal in the PDU, the power consumption signal encoding a unique identification of the computer, wherein the computer and the PDU are distinct and separate physical devices, wherein the computer is not a component within the PDU and the PDU is not a component within the computer;

demodulating, by the PDU, the power consumption signal, including retrieving from the signal the unique identification of the computer; and reporting, by the PDU to the data center management server, an association of the unique identification of the computer and a PDU port.

2. The method of claim 1 wherein:

the power modulating module comprises a set of computer program instructions capable of controlling power consumption by a computer when executed; and generating, by a power modulating module of a computer modulating the power consumption of the computer, a power consumption signal in the PDU signal further comprises executing the computer program instructions by a processor of the computer.

3. The method of claim 1 wherein the power modulating module comprises a hardware aggregation of synchronous and asynchronous logic capable of controlling power consumption by a computer.

4. The method of claim 1 wherein an association of the unique identification of the computer and a PDU port further comprises a port identifier ('ID') of the PDU port that uniquely identifies the PDU port of the PDU.

5. The method of claim 1 wherein generating a power consumption signal further comprises:

modulating the power consumption of the computer to generate an amplitude modulated power consumption signal.

6. The method of claim 1 wherein generating a power consumption signal further comprises:

modulating the power consumption of the computer to generate a frequency modulated power consumption signal.

7. The method of claim 1 wherein generating a power consumption signal further comprises:

modulating the power consumption of the computer to generate a pulse code modulated power consumption signal.

8. An apparatus for mapping computers and ports of power distribution units in a data center, the data center comprising a facility that houses a plurality of computers and equipment supporting computer operations including a data center management server, the computers in the data center connected for power to one of a plurality of power distribution unit ('PDU') ports of a PDU, the PDU comprising one or more power consumption monitoring devices, one or more demodulators, and a communications module, each PDU connected through the communications module and a data communications network to the data center management server, the apparatus comprising a computer processor, a computer memory operatively coupled to the computer processor, the computer memory having disposed within it computer program instructions capable of:

generating, by a power modulating module of a computer, a power consumption signal in the PDU, the power consumption signal encoding a unique identification of the computer, wherein the computer and the PDU are distinct and separate physical devices, wherein the computer is not a component within the PDU and the PDU is not a component within the computer;

demodulating, by the PDU, the power consumption signal, including retrieving from the signal the unique identification of the computer; and reporting, by the PDU to the data center management server, an association of the unique identification of the computer and a PDU port.

9. The apparatus of claim 8 wherein:

the power modulating module comprises a set of computer program instructions capable of controlling power consumption by a computer when executed; and generating, by a power modulating module of a computer modulating the power consumption of the computer, a power consumption signal in the PDU signal further comprises executing the computer program instructions by a processor of the computer.

10. The apparatus of claim 8 wherein the power modulating module comprises a hardware aggregation of synchronous and asynchronous logic capable of controlling power consumption by a computer.

11. The apparatus of claim 8 wherein an association of the unique identification of the computer and a PDU port further comprises a port identifier ('ID') of the PDU port that uniquely identifies the PDU port of the PDU.

12. The apparatus of claim 8 wherein generating a power consumption signal further comprises:

modulating the power consumption of the computer to generate an amplitude modulated power consumption signal.

13. The apparatus of claim 8 wherein generating a power consumption signal further comprises:

modulating the power consumption of the computer to generate a frequency modulated power consumption signal.

14. The apparatus of claim 8 wherein generating a power consumption signal further comprises:

modulating the power consumption of the computer to generate a pulse code modulated power consumption signal.

15. A computer program product for mapping computers and ports of power distribution units in a data center, the data center comprising a facility that houses a plurality of computers and equipment supporting computer operations including a data center management server, the computers in the data center connected for power to one of a plurality of power distribution unit ('PDU') ports of a PDU, the PDU comprising one or more power consumption monitoring devices, one or more demodulators, and a communications module, each PDU connected through the communications module and a data communications network to the data center management server, the computer program product disposed in a signal bearing medium, the computer program product comprising computer program instructions capable of:

generating, by a power modulating module of a computer, a power consumption signal in the PDU, the power consumption signal encoding a unique identification of the computer, wherein the computer and the PDU are distinct and separate physical devices, wherein the computer is not a component within the PDU and the PDU is not a component within the computer;

demodulating, by the PDU, the power consumption signal, including retrieving from the signal the unique identification of the computer; and reporting, by the PDU to the data center management server, an association of the unique identification of the computer and a PDU port.

16. The computer program product of claim 15 wherein:

the power modulating module comprises a set of computer program instructions capable of controlling power consumption by a computer when executed; and generating, by a power modulating module of a computer modulating the power consumption of the computer, a power consumption signal in the PDU signal further comprises executing the computer program instructions by a processor of the computer.

17. The computer program product of claim 15 wherein the power modulating module comprises a hardware aggregation of synchronous and asynchronous logic capable of controlling power consumption by a computer.

18. The computer program product of claim 15 wherein an association of the unique identification of the computer and a PDU port further comprises a port identifier ('ID') of the PDU port that uniquely identifies the PDU port of the PDU.

19. The computer program product of claim 15 wherein generating a power consumption signal further comprises:

modulating the power consumption of the computer to generate an amplitude modulated power consumption signal.

20. The computer program product of claim 15 wherein generating a power consumption signal further comprises:

modulating the power consumption of the computer to generate a frequency modulated power consumption signal.

21. A computer program product for mapping computers and ports of power distribution units in a data center, the data center comprising a facility that houses a plurality of computers and equipment supporting computer operations including a data center management server, the computers in the data center connected for power to one of a plurality of power distribution unit ('PDU') ports of a PDU, the PDU comprising one or more power consumption monitoring devices, one or more demodulators, and a communications module, each PDU connected through the communications module and a data communications network to the data center management server, the computer program product disposed in a computer readable transmission medium, the computer program product comprising computer program instructions capable of:

generating, by a power modulating module of a computer, a power consumption signal in the PDU, the power consumption signal encoding a unique identification of the computer; wherein the computer and the PDU are distinct and separate physical devices, wherein the computer is not a component within the PDU and the PDU is not a component within the computer:

demodulating, by the PDU, the power consumption signal, including retrieving from the signal the unique identification of the computer; and reporting, by the PDU to the data center management server, an association of the unique identification of the computer and a PDU port.

\* \* \* \* \*